(12) United States Patent
Shibuta

(10) Patent No.: US 6,608,413 B2
(45) Date of Patent: Aug. 19, 2003

(54) MOTOR SHAFT CAULKED WITHIN GROOVE OF ECCENTRIC LOAD

(75) Inventor: Masayuki Shibuta, Susono (JP)

(73) Assignee: Mitsubishi Materials C.M.I. Corporation, Shizuoka-ken (JP)

(*) Notice: Subject to any disclaimer, the term of this patent is extended or adjusted under 35 U.S.C. 154(b) by 29 days.

(21) Appl. No.: 09/734,579

(22) Filed: Dec. 13, 2000

(65) Prior Publication Data
US 2002/0047368 A1 Apr. 25, 2002

(30) Foreign Application Priority Data

| Jan. 28, 2000 | (JP) | 2000-019873 |
| May 11, 2000 | (JP) | 2000-137958 |
| Aug. 24, 2000 | (JP) | 2000-253598 |

(51) Int. Cl.⁷ .......................... H02K 00/75; H02K 00/65
(52) U.S. Cl. ........................................ 310/81; 310/42
(58) Field of Search ............... 310/81, 42; H02K 00/75, H02K 00/65

(56) References Cited

U.S. PATENT DOCUMENTS

| 6,288,459 B1 | * | 9/2001 | Furudate et al. | 310/42 |
| 2002/0158528 A1 | * | 10/2002 | Tsuzaki et al. | 310/81 |

FOREIGN PATENT DOCUMENTS

| JP | 06098496 A | * | 9/1992 | H02K/7/075 |
| JP | 06030544 A | * | 2/1994 | H02K/7/075 |
| JP | 7107699 | * | 4/1995 | H02K/7/075 |
| JP | 07288946 A | * | 10/1995 | H02K/7/075 |
| JP | 07336750 A | * | 12/1995 | H02K/7/075 |
| JP | 865948 | * | 3/1996 | H02K/7/075 |
| JP | 8130850 | * | 5/1996 | H02K/7/075 |
| JP | 08130850 A | * | 5/1996 | H02K/7/075 |
| JP | 08205466 A | * | 8/1996 | H02K/7/075 |
| JP | 8205466 | * | 8/1996 | H02K/7/075 |
| JP | 9149592 | * | 6/1997 | H02K/7/075 |
| JP | 09149592 | * | 6/1997 | H02K/7/075 |
| JP | 698496 | * | 4/1998 | H02K/7/075 |
| JP | 10313549 A | * | 11/1998 | H02K/7/075 |
| JP | 10336949 A | * | 12/1998 | H02K/7/065 |
| JP | 11089170 A | * | 3/1999 | H02K/7/065 |
| JP | 11319711 | * | 11/1999 | H02K/7/065 |
| JP | 200083347 | * | 3/2000 | H02K/7/065 |
| JP | 200083348 | * | 3/2000 | H02K/7/065 |
| JP | 2000226632 | * | 8/2000 | H02K/7/075 |
| JP | 2001239212 | * | 9/2001 | H02K/7/065 |
| JP | 200228571 | * | 1/2002 | H02K/7/075 |
| JP | 200244904 | * | 2/2002 | H02K/5/22 |
| JP | 2002153819 | * | 5/2002 | H02K/7/075 |
| JP | 2002273344 | * | 9/2002 | H02K/7/65 |

* cited by examiner

Primary Examiner—Thomas M. Dougherty
Assistant Examiner—H. Y. M. Elkassabgi
(74) Attorney, Agent, or Firm—Wenderoth, Lind, & Ponack, L.L.P.

(57) ABSTRACT

There is provided a vibrator which is integrally coupled to a rotating shaft of a motor. A groove portion in which the rotating shaft is fitted is formed in an eccentric load portion, and side walls extending from the eccentric load portion and forming both side edge portions of the groove portion are provided. A portion of a tip portion end surface of each side wall, except at an outer peripheral portion of the side wall and at a side of the groove portion, is caulked from an opening side of the groove portion toward a bottom side thereof, so that the vibrator is integrally coupled to the rotating shaft.

11 Claims, 6 Drawing Sheets

MOTOR SHAFT CAULKED WITHIN GROOVE OF ECCENTRIC LOAD

BACKGROUND OF THE INVENTION

1. Technical Field of the Invention

The present invention relates to a vibration generating device used for a call or the like of a small wireless machine, for example, a portable or mobile telephone.

2. Prior Art

In recent years, as a kind of a small wireless machine, such as a paging system small wireless calling machine, a PHS, or a portable, mobile telephone, a machine of a type having a built-in vibration generating device made by eccentrically coupling a vibrator of high specific gravity metal to a rotating shaft of a motor has become popular. According to the small wireless calling machine or the like having such a built-in vibration generating device, instead of generation of a ringing tone, a vibration is generated by the rotation of the vibrator so that it is possible to confirm reception without knowledge by another person even in, for example, a crowd or a meeting.

Conventionally, the vibration generating device of this kind of small wireless machine is constructed such that a vibrator of a non-cylindrical shape is integrally coupled with a rotating shaft of a small motor connected to a signal generating circuit of the small wireless machine. This vibrator is made of a high specific gravity metal molded by performing a powder metallurgical method. A cylindrical boss portion is integrally formed at an eccentric load portion of a substantially fan-shaped section. A rotating shaft is inserted into an attachment hole formed in the boos portion, and the boss portion is plastically deformed by caulking, so that the boss portion and the rotating shaft are drawn close to each other, whereby the vibrator is integrally coupled to the rotating shaft.

According to the conventional vibration generating device of this type, since the vibrator itself is caulked and is directly coupled to the rotating shaft, as compared with another conventional vibration generating device in which a vibrator is fixed to a rotating shaft through an adhesive or other coupling manner, there is merit in that it becomes possible to reduce the number of parts of the vibrating generating device.

However, in the above conventional vibration generating device, since the attachment hole must be formed in the inside of the cylindrical boss portion of the vibrator, there has been a problem in that when the vibrator is molded by pressing a powder raw material, it is difficult to fill the powder raw material into the boss portion, especially in a shaping die portion of the boss portion having a thin outer periphery, and the yield of the vibrator is lowered.

Additionally, for the purpose of satisfying a demand for miniaturization in recent years, an attempt has been made to form the vibrator itself to be small. However, since the boss portion around the attachment hole becomes very thin, there has also been another problem in that when caulking is performed by applying a large force, a crack is likely to be generated. On the other hand, if the caulking force is low, a desired pull-out strength cannot be obtained, with the result that the adjustment of the caulking force becomes difficult.

As another conventional vibration generating device, there has been a proposal like that as shown in FIG. 10 and FIG. 11. A groove portion 4, in which a rotating shaft 3 is fit, is formed at a central portion of an eccentric load portion 2 of a vibrator 1. Side walls 5, which define both side edge portions of the groove portion 4, are integrally formed with and extend from the eccentric load portion 2 along the groove portion 4. The central portions of tip portions of the side walls 5, in an axial line direction, are caulked from an opening side of the groove portion 4 toward a bottom side thereof by a caulking punch 7. The tip end of the caulking punch 7 is shaped into an R shape (or round shape) or a rectangular parallelepiped shape, so that the vibrator 1 becomes integrally coupled to the rotating shaft 3.

According to the conventional vibration generating device described above, there are merits in that molding is easier than with the vibrator including the boss portion in which the attachment hole is formed, so that manufacture yield can be improved. Even in the case where the vibrator 1 itself becomes small, as compared with the case where the thin portion such as the outer periphery of the boss portion is caulked, there is little fear that a crack is generated.

However, in the conventional vibration generating device shown in FIGS. 10 and 11, when the tip portion end surfaces of the side walls 5 are caulked, the entire width dimensions from sides of the groove 4 to sides or outer peripheries 6 of the side walls 5 are crushed and, therefore, a high caulking force is required. However, since the rigidity of the portions of the side walls 5 at the sides of the groove 4 is high, because of the rotating shaft 3, when plastic deformation lei performed, bulging or deformation is mainly caused toward the sides or the outer peripheries 6 which become free ends, and as a result, there has been a problem in that a high pull-out strength cannot be obtained. Besides, as a result of a high caulking force being required, when an attempt to increase a tungsten content is made to obtain a desired vibration, even in the case where the vibrator 1 is made small in diameter, it becomes brittle, so that there has also been a problem that a crack is likely to be generated in the caulked side walls 5.

SUMMARY OF THE INVENTION

The present invention has been made in view of the above, and a principal object of the present invention is to provide an improvement in a vibration generating device for a small wireless machine.

Another object of the present invention is to provide a vibration generating device of a small wireless machine in which manufacture of a vibrator is easy, the vibrator can be coupled to a rotating shaft of a motor at a high pull-out strength even by employing a low caulking force, and the whole device can be further miniaturized.

According to a first aspect of the invention there is provided a vibration generating device of a small wireless machine which includes a vibrator integrally coupled to a rotating shaft of a motor, wherein a groove portion in which the rotating shaft is fitted is formed in an eccentric load portion. Side walls extending from the eccentric load portion, and forming both side edge portions of this groove portion are provided. And, a portion of a tip portion end surface of these side walls, except at an outer peripheral portion of the side walls and at a aide of the groove portion, is caulked from an opening side of the groove portion toward a bottom side of the groove portion, so that the vibrator is integrally coupled to the rotating shaft.

According to a second aspect of the invention there is provided a vibration generating device of a small wireless machine in which a vibrator is integrally coupled to a rotating shaft of a motor, wherein an eccentric load portion is formed into a truncated fan shape in which a central angle is less than 180°. Accordingly, the eccentric load portion has a flat surface at a rotational central side. A groove portion in which the rotating shaft is fitted is formed in the flat surface. Side walls forming both side edge portions of this groove portion are provided. A portion of the flat surface, except at an outer peripheral side portion of the side walls and at a side of the groove portion, is caulked from an opening side of the groove portion toward a bottom side of the groove portion, so that the vibrator is integrally coupled to the rotating shaft.

Further, according to a third aspect of the invention, which is a modification of the first aspect or second aspect of the invention, there is provided a vibration generating device of a small wireless machine, wherein a caulked portion formed into a concave shape in the tip portion end surface of the first aspect or the flat surface of the second aspect, respectively, by caulking from the opening side of the groove portion toward the bottom side thereof is formed so that a length dimension at the side of the groove portion in an axial line direction is longer than a length dimension at an outer peripheral side of the groove portion.

According to a fourth aspect of the invention, in a width dimension W of the tip portion end surface or the flat surface as recited in any one of the first to third aspects, from the side of the groove portion to the outer peripheral side thereof, a range of 0.25 W to 0.9 W from an edge portion at the side of the groove portion is caulked.

Further, according to a fifth aspect of the invention, the groove portion of the vibrator as recited in any one of the first to fourth aspects is formed to have such a size as to internally contain a range exceeding a central angle of 180° of the rotating shaft. And, an opening width $W_1$ of the groove portion is set so that a ratio of $W_1$ to a diameter D of the rotating shaft of the motor ($W_1/D$) is in a range of 0.70 to 0.95.

In the vibration generating device of the small wireless machine as recited in any one of the first to fifth aspects of the invention, the rotating shaft of the motor is fitted in the groove portion, and in the tip portion end surfaces or the flat surfaces of the side walls forming both side edge portions of this groove portion, the portion, except at the outer peripheral side portion and at the side of the groove portion, is caulked toward the bottom side of the groove portion. Accordingly, as compared with the conventional vibration generating device shown in FIG. 10 and FIG. 11, it becomes possible to couple the vibrator to the rotating shaft by employing a lower caulking force. At the same time, the outer peripheral portion of the side walls which are not caulked function as wall portions against the plastic deformation in the caulked portion, and consequently, the greater part of the caulked portion is extended over the groove portion. Then, the vibrator is firmly fixed to the rotating shaft at three points, i.e. the bottom portion of the groove portion, and both of the extended side walls. Thus, according to the vibration generating device of the present invention, the manufacture of the vibration generating device is easy, and further, it is possible to couple the vibrator to the rotating shaft of the motor at a high pull-out strength even by employing a lower caulking force.

From the above, according to the vibration generating device of the present invention (as recited in any one of the first to fifth aspects), since the vibrator can be firmly fixed to the rotating shaft of the motor by employing a lower caulking force than that of the prior art, it is possible to realize miniaturization and lightening of the vibrator, as well as miniaturization and lightening of the vibration generating device and the entirety of the small wireless machine.

Additionally, because the caulking load can be made small generation of a crack in the vibrator can be prevented, productivity of the vibration generating device is improved, and it becomes possible to improve the vibration efficiency by realization of the high specific gravity of the vibrator.

Here, especially in the third aspect of the invention described above, the length dimension of the caulked portion in the axial line direction at the side of the groove portion, where most portions are extended toward the side of the rotating shaft, becomes larger than that at the peripheral side of the groove portion which functions as the wall portion when the caulked portion is plastically deformed. Accordingly, the vibrator can be coupled to the rotating shaft of the motor at a high pull-out strength by employing a lower caulking force. In addition, it becomes possible to use a caulking punch which can be easily manufactured and has a circular shape in cross section, and the use life of the caulking punch can be greatly lengthened.

The fourth aspect of the invention is based upon any one of the first to third aspects of the invention described above. Namely, in the tip portion end surface or the flat surface of the side walls, when the portion, except at the outer peripheral side portions of the groove portion and at the groove sides, is caulked toward the bottom side of the groove portion, in the width dimension W of the tip portion end surface or the flat surface from the groove side to the outer peripheral side of the groove portion, it is preferable to caulk the range of 0.25 W to 0.9 W from the edge portion of the side of the groove portion. At this time, in the case where the caulking width dimension is small, it is sufficient if the caulking length dimension in the axial line direction is made large, and on the contrary, in the case where the caulking width dimension is large, even if the caulking length dimension in the axial line direction is small, a sufficient pull-out strength can be obtained. The range of caulking is limited to the range of 0.25 W to 0.9 W because, if the range is smaller than 0.25 W it becomes difficult to obtain a sufficient plastic deformation amount to firmly fix the vibrator to the rotating shaft of the motor, and if the range exceeds 0.9 W the foregoing function of the wall portion counteracting the plastic deformation of the caulked portion is decreased, and as a result, the outer peripheral portion is also forcibly deformed outwardly such that the pull-out strength is lowered.

Additionally, the shapes of the side walls may be formed so that the entirety of the groove portion becomes U-shaped by erecting the side walls from both side edges. In this case, in the state where the rotating shaft is fitted in the groove portion, the rotating shaft is internally contained in the groove portion within the range of a central angle of 180°. On the other hand, like with the fifth aspect of the invention, when the groove portion of the vibrator is formed to have such a size that the range of the central angle of 180° or more of the rotating shaft is internally contained, and the opening width $W_1$ of the groove portion is set so that the ratio of $W_1$ to the diameter D of the rotating shaft ($w_1/P$) becomes within the range of 0.70 to 0.95 as a result of the plastic deformation of the side wall after caulking, it is possible to fill the opening portion of the groove portion more effectively and to firmly fix the vibrator, which is preferable.

DETAILED DESCRIPTION OF THE PREFERRED EMBODIMENTS (First Embodiment)

Figure 1:
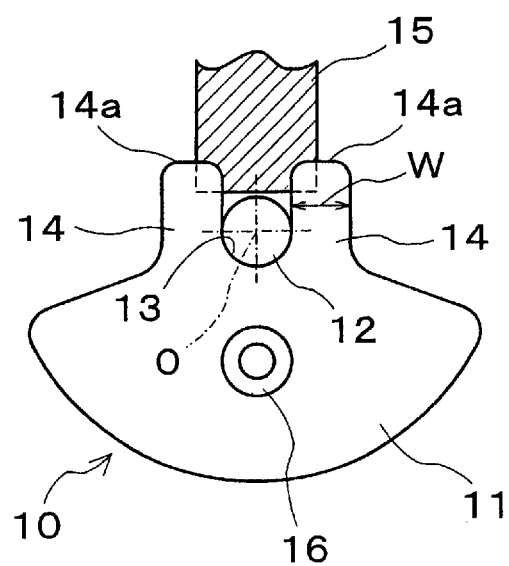
FIG. 1 is a front view showing a caulking state according to a first embodiment of the present invention.
Figure 2:
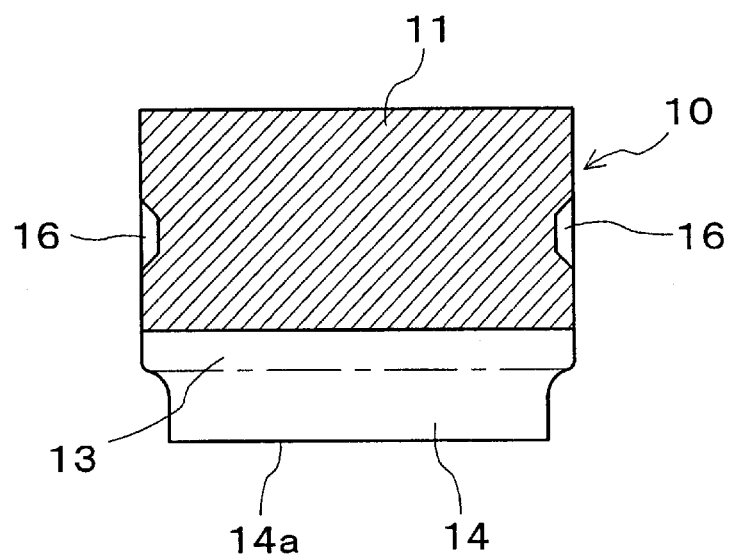
FIG. 2 is a longitudinal sectional view of a vibrator of FIG. 1.
Figure 3:
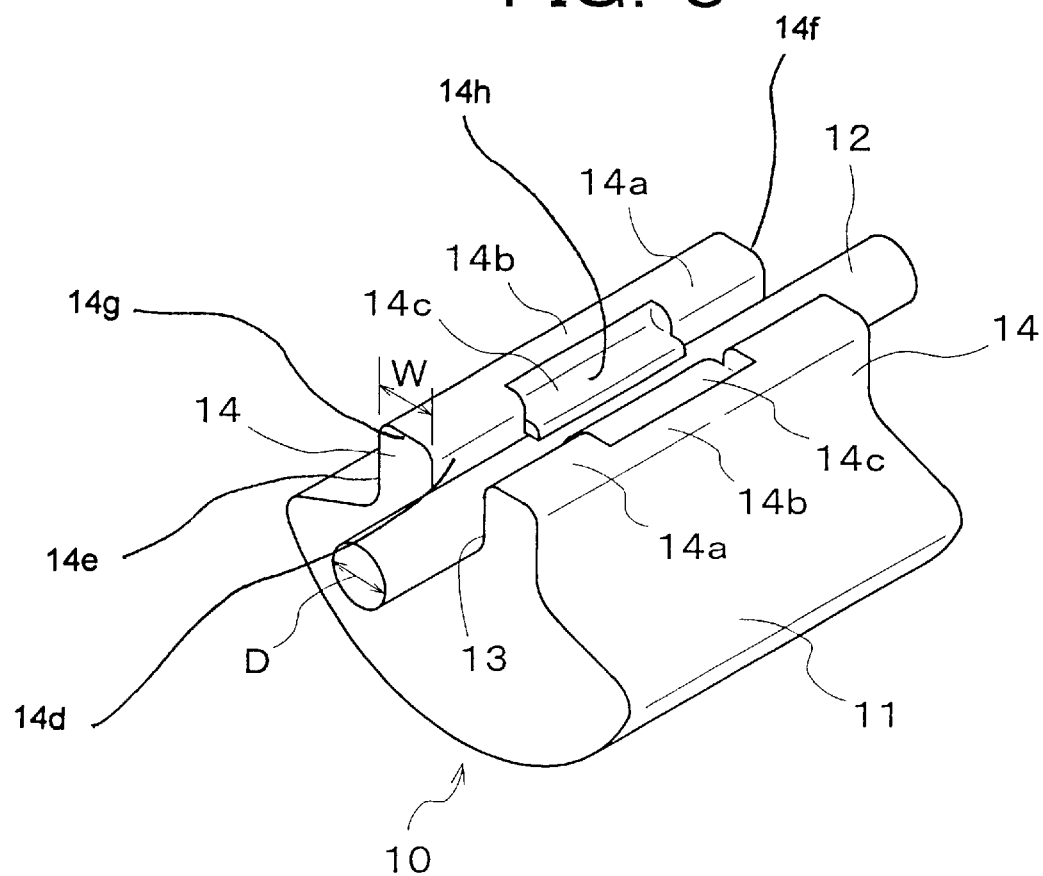
FIG. 3 is a perspective view showing the first embodiment of the present invention.

FIGS 1 to 3 show a vibrator 10 according to a first embodiment of the present invention. The vibrator 10, which is made of a high specific gravity metal molded by performing a powder metallurgical technique, has a substantially fan-shaped cross section with an axial line 0 as the center, and an eccentric fan-shaped portion extending from the axial line 0 becomes or serves as an extending load portion 11. In the vibrator 10, a groove portion 13 in which a rotating shaft 12 of a motor is fitted, and which has a bottom portion of a semi-circular shape almost equal to the diameter of the rotating shaft 12, is formed at the central portion of an outer peripheral arc which depicts the fan shape of the eccentric load portion 11. Further, side walls 14 which extend from the eccentric load portion 11 in parallel with each other, and define opposed side edge portions of the groove 13 portion, are integrally formed at both side edge portions of the groove portion 13. In this kind of vibrator 10, generally, an arc radius of the eccentric load portion 11 is as small as several mm, and consequently, it is difficult to distinguish between vibrators of different sizes, so that concave identification marks 16 of various shapes (circle in the drawing) indicating the size of the vibration generating device 10 are formed at both end surfaces of the eccentric load portion 11.

Then, in a tip portion end surface 14a of the side wall 14, at a central portion, but not at both end portions in the direction of the axial line 0, a portion 14c, except at an outer peripheral side portion 14b of the side wall 14 and at the side 12 of the groove 13, is caulked by a rectangular parallelepiped caulking punch 15 from an opening side of the groove 13 to a bottom side thereof, so that the above vibrator 10 is integrally coupled to the rotating shaft 12. Here, in a width dimension W of the tip portion end surface 14a from the side of the groove portion 13 to an outer peripheral side, the portion 14c to be caulked at the side of the groove portion 13 is set in the range of 0.25 W to 0.9 W from the edge portion at the side of the groove 13.

In other words, as shown in FIG. 3 each sidewall 14 includes: an inner surface 14d such that the groove 13 is defined between these inner surfaces; an outer surface 14e; the end surface 14a, which interconnects the inner surface and the outer surface, with the end surface having a first end 14f and a second end 14g; and the caulked portion 14c which extends into the groove from a location that is between the inner surface and the outer surface, with the caulked portion being positioned at a level that is closer to the bottom of the groove than is the level at which the end surface is positioned such that defined in the end surface is a recess 14h which opens into the groove and does not extend completely across the end surface, whereby along an intersection of the end surface and the outer surface the end surface is continuous from the first end to the second end as shown by the outer peripheral side portion 14b.

The rotating shaft 12 can be made of stainless steel, for example, SUS 420 or the like. The vibrator 10 is preferably molded by using an ultra heavy alloy material of a specific gravity of about 17 to 19 g/cm³, for example, W—Ni system, W—Ni—Fe system, W—Ni—Cu system, W—Mo—Ni—Fe system, or the like, and by performing a powder metallurgical technique. Specifically, a mixture powder of a composition made of: W powder of 89 to 98 weight %, and Ni powder of 1.0 to 11 weight %, or a mixture powder of a composition containing the W powder and Ni powder in the above range of weight %, and one or more kinds of Cu of 0.1 to 6 weight %, Fe powder of 0.1 to 6 weight %, Mo powder of 0.1 to 6 weight %, and Co powder of 0.1 to 5 weight % is or are compacted into a fan plate shape by applying a pressure of 1 ton/cm² to 4 ton/cm². This compact is liquid phase sintered in a hydrogen gas stream having a dew point of 0° C. to −6° C. or in an ammonia decomposition gas, and thereafter, the compact is further heated in the temperature range of 700° C. to 1430° C.±30° C. in a vacuum, neutral or reducing atmosphere. Then, a heat treatment to rapidly cool the compact to at least 300° C. at a cooling rate of 40° C./min or more is performed.

In the composition of such a vibrator 10, when the W (tungsten) content exceeds 98 weight %, the specific gravity becomes high although the malleability (or ductility) is lowered, and in the case where the W content is less than 89 weight %, a predetermined specific gravity cannot be obtained, and thus the vibrator exhibits disadvantages. Also in the case where the N (nickel) content exceeds 11 weight %, a predetermined specific gravity cannot be obtained, and in the case where the Ni content is less than 1.0 weight %, sintering does not result. Further, although Co (cobalt) has the same effect as Ni, when the Co content is less than 0.1 weight %, a sufficient effect of its addition cannot be obtained, and on the other hand, even if the Co content exceeds 5 weight %, an adequate effect can not be obtained and the manufacture of the vibrator becomes non-economical. When the Cu powder and Fe powder are contained, although a sintering temperature can be lowered, a predetermined specific gravity cannot be obtained in a range over the aforementioned upper limit value.

Figure 10:
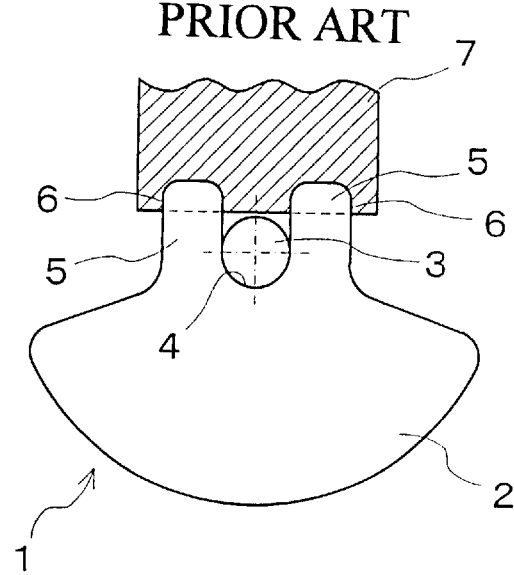
FIG. 10 is a front view showing a caulking state in a conventional prior art vibration generating device.
Figure 11:
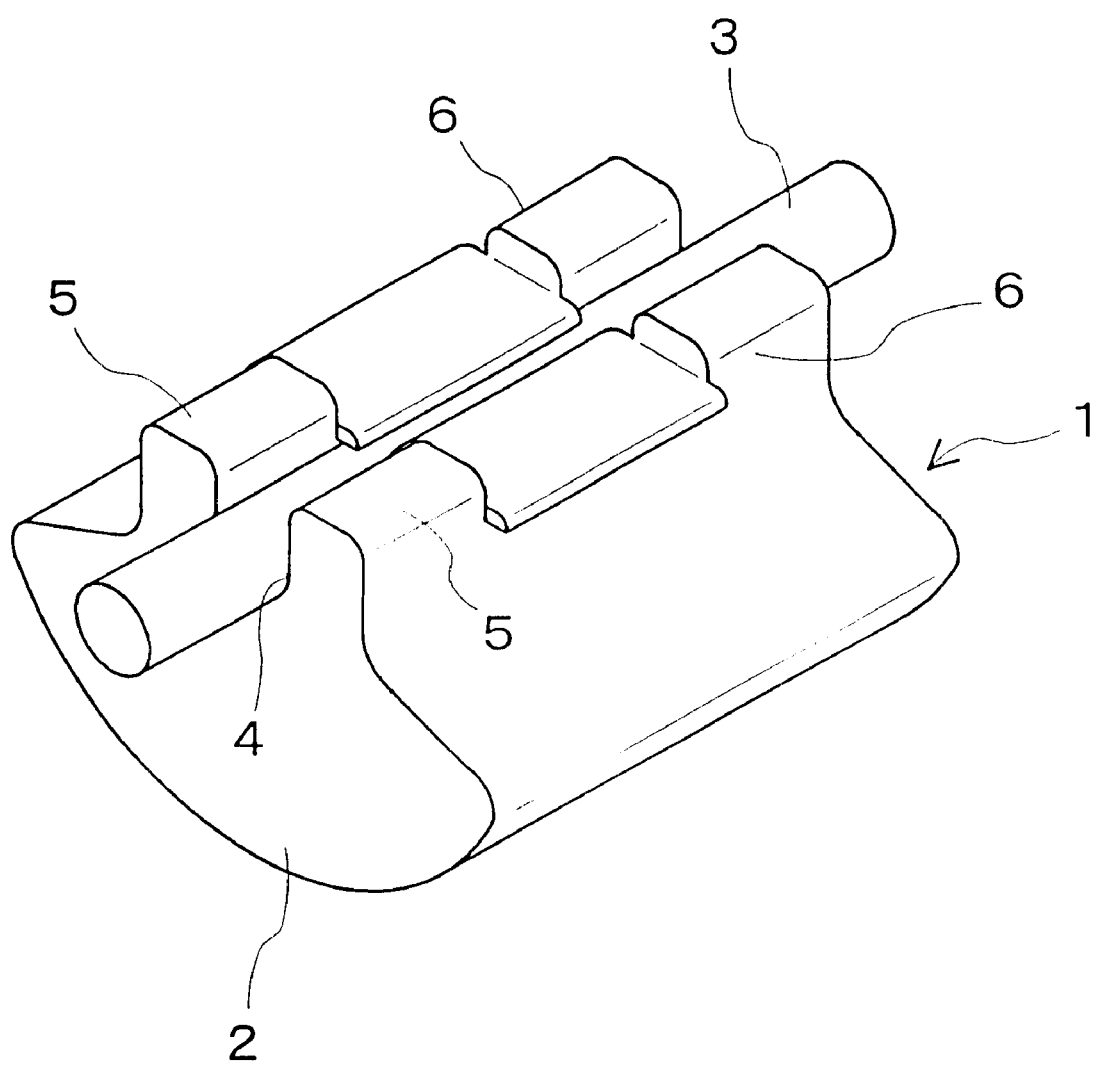
FIG. 11 is a perspective view showing the conventional prior art vibration generating device caulked as shown in FIG. 10.

According to the vibration generating device of the small wireless machine having the above structure of composition, the rotating shaft 12 of the motor is fitted in the groove portion 13, and in the tip portion end surfaces 14a of the side walls 14 forming both side edge portions of the groove portion 13, except at the outer peripheral side portions 14b, in the width dimension W from the side of the groove portion 13 to an outer peripheral side thereof, the portion 14c in the range of 0.25 W to 0.9 W from the edge portion at the side of the groove portion 13 is caulked by the caulking punch 15 toward the bottom side of the groove portion 13, so that as compared with the conventional vibration generating device as shown in FIGS. 10 and 11, it is possible to couple the vibrator to the rotating shaft by applying a lower caulking force.

At this time, since the outer peripheral side portion 14b of the side wall, which is not caulked, functions as a wall portion against the plastic deformation of the caulked portion 14c, the greater part of the caulked portion 14c extends over the side of the groove portion 13, and consequently, the vibrator 10 can be firmly fixed to the rotating shaft 12 at three points, i.e. of the bottom portion of the groove portion 13, and both caulked portions 14c. Thus, manufacture of the vibrator 10 is easy, and the vibrator can be coupled to the rotating shaft of the motor at a high pull-out strength even by applying a low caulking force.

According to the vibration generating device described above, since the vibrator 10 can be firmly fixed to the rotating shaft 12 by applying a lower caulking force than that of the prior art, miniaturization and lightening of the vibrator 10 itself, and further, miniaturization and lightening of the vibration generating device and the entirety of the small wireless machine can be realized. Besides, since the caulking load is made small and generation of a crack in the vibrator 10, especially at the side wall 14 can be prevented, it becomes possible to increase the productivity of the vibration generating device and to improve the vibration efficiency through realization of the high specific gravity of the vibrator 10.

[Experiment]

An experiment was performed in which the pull-out strength of the vibrator 10 fixed to the rotating shaft 12, by performing the caulking operation according to the present invention, was compared with the pull-out strength of the conventional vibrator 1 fixed to the rotating shaft 3 by performing the conventional caulking technique as shown in FIGS. 10 and 11. In the comparison experiment, by using the vibrators 1 and 10 and the rotating shafts 3 and 12, respectively, having the same shape, five vibration generating devices were produced in each group.

In the above vibrators 1 and 10 used for the experiment, the outer diameter of each of the eccentric load portions 2 and 11 was 3 mm, the length in the direction of the axial line 0 was 5 mm, the inner diameter of each of the groove portions 4 and 13 was 0.4 mm, the height of each of the side walls 5 and 14 from the bottoms of the groove portions 4 and 13 was 1.1 mm, the width W of each of the side walls 5 and 14 was 0.7 mm, and the outer diameter of each of the rotating shafts 3 and 12 was 0.8 mm.

In the conventional vibration generating device, the side wall 5 extending over the entire width dimension was crushed alone a length of 2.6 mm in the axial line direction by the caulking punch 7. On the other hand, in the vibration generating device of the present invention, by using the caulking punch 15 with a width size of 1.4 mm, (0.43 W) i.e. 0.3 mm of the respective side walls 14 from the side of the groove portion 13 was crushed alone a length of 2.0 mm in the axial line direction.

With respect to the five vibration generating devices in each group obtained in this way, a pull-out test of the conventional vibrators 1 and the inventive vibrators 10 was carried out, and it was found that while the extracting force (kgf) was 5.3, 4.9, 5.5, 5.5, 5.4 (average 5.3) for the conventional vibration generating device, the extracting force (kgf) was 10.3, 11.0, 10.5, 10.3, 10.2 (average 10.5) for the vibration generating device of the present invention. That is, in spite of the fact that the caulking length in the axial line direction was shorter by 0.6 mm, a pull-out strength of almost twice that of the conventional pull-out strength was obtained.

(Second Embodiment)

Figure 4:
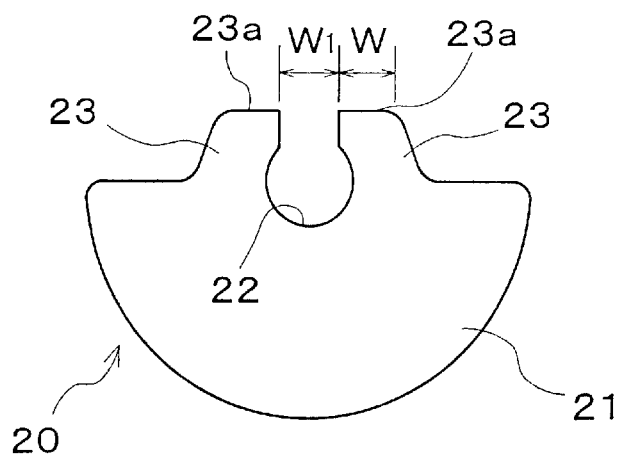
FIG. 4 is a front view showing the shape of a vibrator according to a second embodiment of the present invention.
Figure 5:
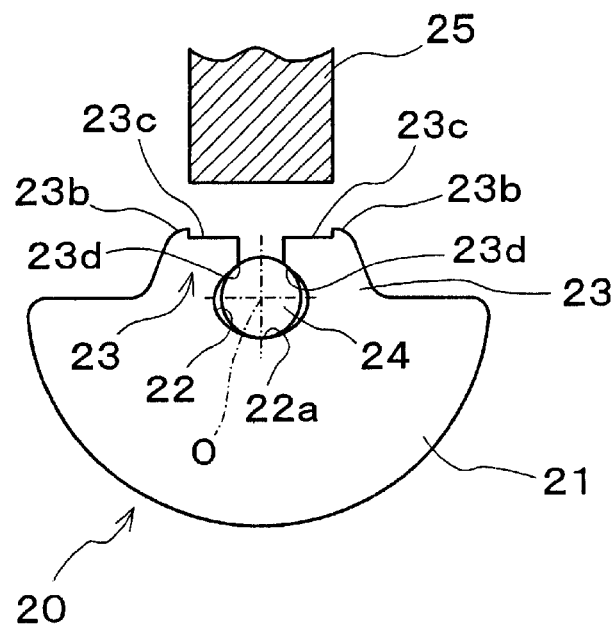
FIG. 5 is a front view showing a state where the vibrator of FIG. 4 is caulked.

FIGS. 4 and 5 show a second embodiment of the present invention. In this vibration generating device, a groove portion 22 having a bottom portion 22a of a substantially semicircular shape is formed in an eccentric load portion 21 of a vibrator 20. Side walls 23 forming both side walls of this groove portion 22 are integrally formed so as to cover an exposed portion of a rotating shaft 24 of a motor fitted in the groove portion 22 with an interval on both sides in the direction of an axial line 0. As a result, the groove portion 22 of the vibrator 20 is formed to have such a size as to internally contain the range of a central angle of 180° or more of the rotating shaft 24. An opening width $W_1$ of the groove portion 22 between the opposing side walls 23 is set so that a ratio of $W_1$ to a diameter D of the rotating shaft 24 ($W_1/D$) is in the range of 0.70 to 0.95.

As a specific example in which such a range is obtained, in the case where the diameter D (mm) of the rotating shaft 24 is 0.4, 0.5, 0.6, 0.7, 0.8, 0.9 or 1.0, it is sufficient if the opening width $W_1$ (mm) of the groove portion 22 between the side walls 23 is set to 0.3, 0.4, 0.5, 0.6, 0.7, 0.8, or 0.9.

As shown in FIG. 5, in a tip portion end surface 23a of the side wall 23, and at the central portion thereof, but not at both ends thereof, in the direction of the axial line 0, a portion 23c, which does not include an outer peripheral side portion 23b of the side wall 23, at the side of the groove portion 22 is caulked by a rectangular parallelepiped caulking punch 25 from an opening side of the groove portion 22 to a bottom side thereof, so that the above vibrator 20 is integrally coupled to the rotating shaft 24. At this time, similarly to the first embodiment, in a width dimension W of the tip portion end surface 23a from the side of the groove portion 22 towards the outer peripheral side of the tip portion end surface 23a, the caulked portion 23c at the side of the groove portion 22 is set so that it is in the range of 0.25 W to 0.9 W from an edge portion at the side of the groove portion 22.

Also in the vibration generating device having the above structure shown in FIGS. 4 and 5, the same function and effect as those of the first embodiment can be obtained, and especially in the vibrator 20 of the second embodiment, the groove portion 22 of the vibrator 20 is formed to have such a size as to internally contain the range of a central angle of 180° or more of the rotating shaft 24. The opening width $W_1$ of the groove portion 22 is set so that the ratio of $W_1$ to the diameter D of the rotating shaft 24 ($W_1/D$) is in the range of 0.70 to 0.95, so that the vibrator 20 is firmly fixed to the rotating shaft 24 at three points, i.e. the bottom portion 22a of the groove portion 22, and bottom portions 23d of the side walls 23. As a result, it is possible to fix the vibrator 20 to the rotating shaft 24 by applying a lower caulking force.

(Third Embodiment)

Figure 6:
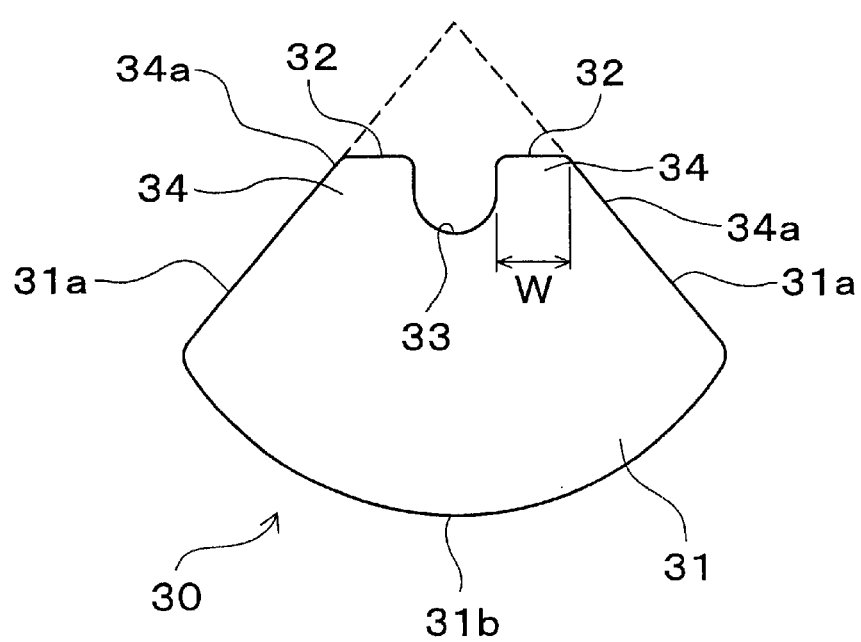
FIG. 6 is a front view showing the shape of a vibrator according to a third embodiment of the present invention.
Figure 7:
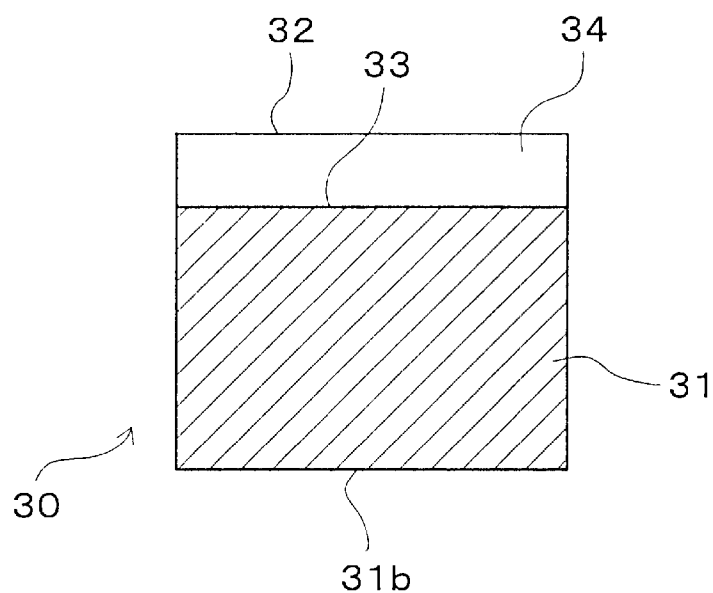
FIG. 7 is a longitudinal sectional view of the vibrator shown in FIG. 6.

FIGS. 6 and 7 show a vibrator 30 of a third embodiment. In this vibrator 30, the entirety of an eccentric load portion 31 is formed into a shape of a truncated fan-shaped cross section in which a central portion, indicated by a dotted line in the drawing, of a fan shape with a central angle of less than 180° is removed. By this, flat surfaces 32 are formed at the rotational central side of the vibrator 30, and a U-shaped groove portion 33, in which the rotating shaft is fit, is formed at the center of these flat surfaces 32. As a result, side walls 34 forming both side edge portions of the groove portion 33 are formed at both sides of this groove portion 33. An outer peripheral surface 34a of the side wall 34 is formed into a slanted flat surface shape which is continuous with an outside surface 31a of the eccentric load portion 31, and leads to an arc-shaped outer peripheral surface 31b.

Similar to the first embodiment, in the flat surface 32 which becomes a tip portion end surface of the side wall 34, and at the central portion thereof, but not both end portions, in the axial line direction, a portion of the side wall 34, which does not include a portion at the side of the outer peripheral surface 34a, at the side of the groove portion 33 is caulked by a rectangular parallelepiped caulking punch from the opening side of the groove portion 33 to the bottom side thereof, so that the above vibrator 30 is integrally coupled to the rotating shaft. Also in this vibrator 30, in the width dimension W of the flat surface 32 from the side of the groove portion 33 towards the outer peripheral side of the flat surface 32, the caulked portion at the side of the groove portion 33 is set so that it is in the range of 0.25 W to 0.9 W from an edge portion at the side of the groove portion 33.

Also in the vibration generating device made of the above structure of the third embodiment of the invention, the same function and effect as those shown in the first embodiment can be obtained, and further, the entirety of the vibrator 30 is formed into the shape having the central angle of less than 180°, and having the truncated fun-shaped cross section in which the flat surfaces 32 are formed at the central portion. Therefore, there are such advantages that a metal mold shape for forming the vibrator 30 by a powder molding technique is simplified, and manufacture becomes easy. Further, since the center of gravity can be set at a position decentered (or eccentric) from the rotating shaft to the outside of the rotating shaft, a desired vibration can also be obtained.

(Fourth Embodiment)

Figure 8:
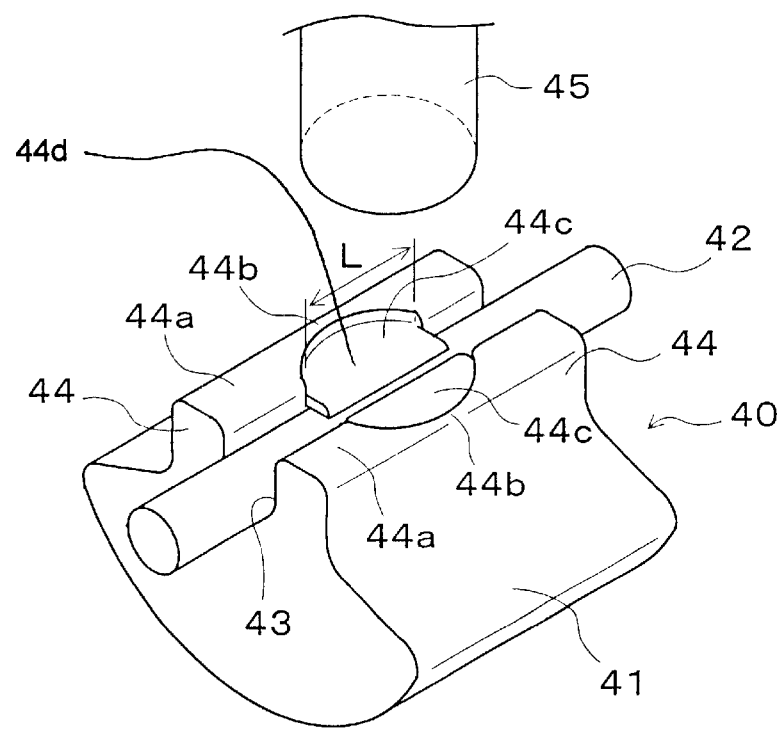
FIG. 8 is a perspective view showing a fourth embodiment of the present invention.
Figure 9:
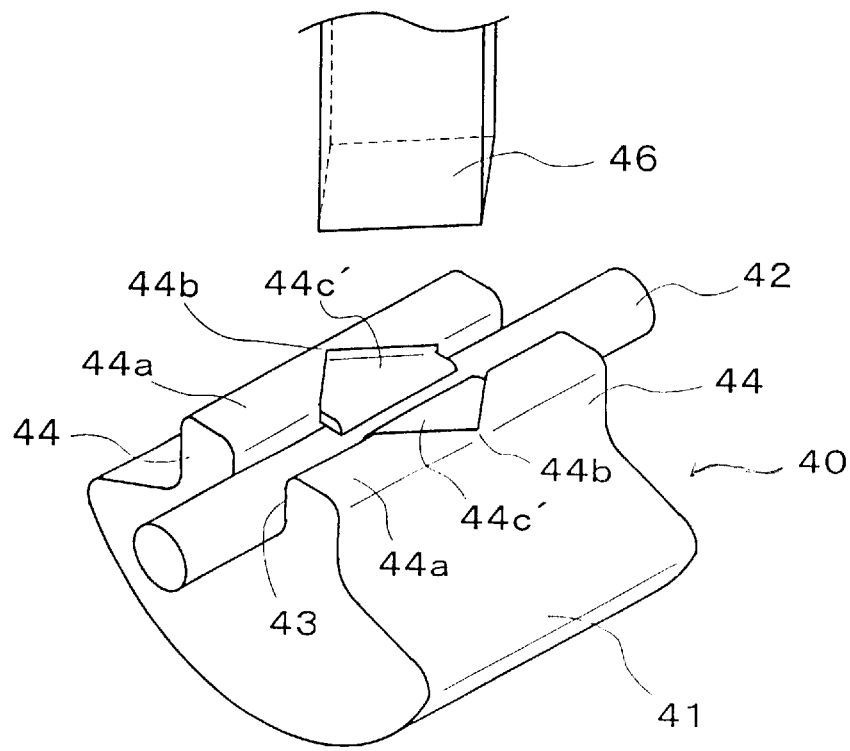
FIG. 9 is a perspective view showing a modified example of the fourth embodiment.

FIGS. 8 and 9 show a vibrator 40 according to a fourth embodiment of the invention and its modified example, respectively. The vibrator 40 has substantially the same shape as that shown in the first embodiment, and the entirety of a fan-shaped portion that is eccentric from its axial line is an eccentric load portion 41. In the vibrator 40, a semicircular groove portion 43, in which a rotating shaft 42 of a motor is fit and which has a bottom portion with a size substantially equal to a diameter of the rotating shaft 42, is formed at the central portion of an outer peripheral arc which depicts the fan shape of the eccentric load portion 41. Side walls 44 extending from the eccentric load portion 41 in parallel with each other, and defining both side edge portions of the groove portion 43, are integrally formed at both side edge portions of the groove portion 43.

Then, in a tip portion end surface 44a of the side wall 44, and at the central portion thereof, but not at both end portions thereof, in an axial line direction, a portion 44c of the side wall 44, which does not include an outer peripheral side portion 44b of the side wall 44, at the side of the groove 43 is caulked by a cylindrical caulking punch 45 from an opening side of the groove portion 43 to a bottom side thereof, so that the above vibrator 40 is coupled to the rotating shaft 42. Here, as a result of caulking by the cylindrical caulking punch 45, concave caulked portions 44c formed at the tip portion end surfaces 44a, respectively, become substantially semi-circular, and are formed so that a length dimension L in the axial line direction at the side of the groove portion 43 (i.e. a first side of a recess 44d defined by caulked portion 44c) becomes larger than a length dimension at an outer peripheral side of the concave caulked portions 44c (i.e. a second side of the recess 44d).

In a vibrator 40 shown in FIG. 9, at the central portion of a tip portion end surface 44a, a portion 44c' of a side wall 44, which does not include an outer peripheral side portion 44b of the sidewall 44, at the side of a groove portion 43 is caulked by a caulking punch 46. The caulking is performed such that a corner portion of the caulking punch 46, having a square section, is positioned as an outer peripheral side of the caulking punch 46, so that the vibrator 40 becomes integrally coupled to a rotating shaft 42. Accordingly, the concave caulked portion 44c' formed by caulking with the caulking punch 46 exhibits a triangular shape having a bottom side at a side of the groove portion 43.

As a result, according to the above vibration generating devices shown in FIG. 8 and FIG. 9, the same function and effect as those shown in the first and second embodiments are obtained, and further, the length dimensions of the caulked portions 44c and 44c' are formed so that the dimension at the side of the groove portion 43, where the moot material extends over to the side of the rotating shaft 42, becomes larger than that at the outer peripheral side of the caulked portions, which function as a wall portion when the caulked portions 44c and 44c' are plastically formed. Accordingly, the total volume of the side wall 44 to be plastically deformed becomes small, and a high pull-out strength can be obtained by employing a low caulking force. In addition, it is possible to use the caulking punch 45, which is easily manufactured and has the circular section, and it is also possible to greatly enlarge the use life of the caulking punches 45 and 46.

With respect to the vibrators 10, 20, 30 and 40 in the first to fourth embodiments of the invention, although the description has been made only with regard to the case where the eccentric load portions 11, 21, 31, and 41 have the substantially fan-shaped section or truncated fan-shape section, the invention is not limited to this, and it is also possible to use some other modified structures including eccentric load portions of various shapes, for example, a substantially semi-circular section or the like.

Also with respect to the groove portions 13, 22, 33, and 43, the bottom portions are not limited to the semi-circular shape, but they can be formed of various sectional shapes, such as a substantially square section or a substantially trapezoidal section.

EFFECT OF THE INVENTION

As described above, according to the vibration generating device of the small wireless machine as recited in any one of first to fifth aspects of the invention, since the vibrator can be firmly fixed to the rotating shaft of the motor by employing a lower caulking force than that associated with the prior art, miniaturization and lightening of the vibrator, and miniaturization and lightening of the vibration generating device and the entirety of the small wireless machine can be realized. Also, a caulking load can be made small and the generation of a crack of the vibrator can be prevented, and consequently, productivity of the vibration generating device can be improved. Also, it becomes possible to improve the vibration efficiency by realization of the high specific gravity of the vibrator.

Here, especially according to the invention as recited in the third aspect of the invention, the vibrator with a high pull-out strength can be coupled to the rotating shaft of the motor by applying a low caulking force. Further, it becomes possible to use the caulking punch which is easily manufactured and has the circular section, and the use life of the caulking punch can be greatly lengthened.

Additionally, according to the invention as recited in the fifth aspect of the invention, the groove portion of the vibrator is formed to have such a size as to internally contain the range of the central angle of 180° or more of the rotating shaft. Also, the opening width $W_1$ of the above groove portion is set so that the ratio of $W_1$ to the diameter D of the rotating shaft ($w_1/D$) is in the range of 0.70 to 0.95.

Accordingly, it is possible to obtain an effect that after caulking, the opening portion of the groove portion is further effectively filled by the plastic deformation of the side wall, and the vibrator can be firmly fixed to the shaft of the motor.

What is claimed is:

1. A vibration generating device for a small wireless machine, comprising:

an eccentric load portion;

two side walls extending from said eccentric load portion, each of said two side walls having
  (i) an inner surface, such that a groove having an open end and a bottom is defined between said inner surface of one of said two side walls and said inner surface of the other of said two side walls,
  (ii) an outer surface,
  (iii) an end surface interconnecting said inner surface and said outer surface and positioned at a level relative to the bottom of said groove, said end surface having a first end and a second end, and
  (iv) a caulked portion extending into said groove from a location that is between said inner surface and said outer surface, and said caulked portion being positioned at a level that is closer to the bottom of said groove than is the level at which said end surface is positioned such that defined in said end surface is a recess which opens into said groove and does not extend completely across said end surface, whereby along an intersection of said end surface and said outer surface said end surface is continuos from said first end to said second end; and a motor shaft positioned within said groove between said caulked portion of each of said two side walls and the bottom of said groove.

2. The vibration generating device according to claim 1, wherein said recess has a first side and a second side, with said first side being nearer to said inner surface than is said second side and with said second side being nearer to said outer surface than is said first side, and with said first side having a dimension extending in a direction from said first end of said end surface to said second end of said end surface that is greater than a dimension of said second side extending in a direction from said first end of said end surface to said second end of said end surface.

3. The vibration generating device according to claim 2, wherein said end surface has a width dimension W extending from said inner surface to said outer surface, and said recess extends from said inner surface toward said outer surface a distance within a range of from 0.25W to 0.90W.

4. The vibration generating device according to claim 3, wherein said motor shaft has a diameter, and wherein said inner surface is configured such that said groove includes a portion that surrounds said motor shaft for at least 180° of said motor shaft and such that the open end of said groove has a width that is from 70% to 95% of the diameter of said motor shaft.

5. The vibration generating device according to claim 1, wherein said motor shaft has a diameter, and wherein said inner surface is configured such that said groove includes a portion that surrounds said motor shaft for at least 180° of said motor shaft and such that the open end said groove has a width that is from 70% to 95% of the diameter of said motor shaft.

6. The vibration generating device according to claim 1, wherein said eccentric load portion is of a truncated fan shape having two flat surfaces that correspond to said end surfaces of said two side walls respective, and said outer surfaces of said two side walls respectively correspond to outer surfaces of said truncated fan shape that form an angle of less than 180° with one another.

7. The vibration generating device according to claim 6, wherein said recess has a first side and a second side, with said first side being nearer to said inner surface than is said second side and with said second side being nearer to said outer surface than is said first side, and with said first side having a dimension extending in a direction from said first end of said end surface to said second end of said end surface that is greater than a dimension of said second side extending in a direction from said first end of said end surface to said second end of said end surface.

8. The vibration generating device according to claim 7, wherein said end surface has a width dimension W extending from said inner surface to said outer surface, and said recess extends from said inner surface toward said outer surface a distance within a range of from 0.25W to 0.90W.

9. The vibration generating device according to claim 6, wherein said end surface has a width dimension W extending from said inner surface to said outer surface, and said recess extends from said inner surface toward said outer surface a distance within a range of from 0.25W to 0.90W.

10. The vibration generating device according to claim 9, wherein said motor shaft has a diameter, and wherein said inner surface is configured such that said groove includes a portion that surrounds said motor shaft for at last 180° of said motor shaft and such that the open end of said groove has a width that is from 70% to 95% of the diameter of said motor shaft.

11. The vibration generating device according to claim 6, wherein said motor shaft has a diameter, and wherein said inner surface is configured such that said groove includes a portion that surrounds said motor shaft for at least 180° of said motor shaft and such that the open end of said groove has a width that is from 70% to 95% of the diameter of said motor shaft.

* * * * *